United States Patent
Sakane et al.

(10) Patent No.: US 7,445,014 B2
(45) Date of Patent: Nov. 4, 2008

(54) DISH WASHING AND DRYING DEVICE

(75) Inventors: Yasuaki Sakane, Osaka (JP); Tatsumi Tomibayashi, Nara (JP); Hiroyoshi Inoue, Yao (JP); Kazushi Furukawa, Osaka (JP); Yasuhiro Sakoda, Wakayama (JP)

(73) Assignee: Sharp Kabushiki Kaisha, Osaka (JP)

( * ) Notice: Subject to any disclaimer, the term of this patent is extended or adjusted under 35 U.S.C. 154(b) by 694 days.

(21) Appl. No.: 10/479,062

(22) PCT Filed: Dec. 20, 2002

(86) PCT No.: PCT/JP02/13409

§ 371 (c)(1), (2), (4) Date: Nov. 26, 2003

(87) PCT Pub. No.: WO03/056998

PCT Pub. Date: Jul. 17, 2003

(65) Prior Publication Data

US 2004/0144408 A1    Jul. 29, 2004

(30) Foreign Application Priority Data

Dec. 28, 2001 (JP) .............................. 2001-399748

(51) Int. Cl.
*B08B 3/00* (2006.01)

(52) U.S. Cl. ................. 134/58 D; 134/56 R; 134/57 D; 134/172; 134/200

(58) Field of Classification Search ............... 134/56 R, 134/57 D, 58 D, 172, 200
See application file for complete search history.

(56) References Cited

U.S. PATENT DOCUMENTS

| 2,611,256 A | * | 9/1952 | Candor ...................... 68/12.14 |
| 2004/0144408 A1 | | 7/2004 | Sakane et al. |
| 2004/0149314 A1 | * | 8/2004 | Cha et al. ..................... 134/18 |

FOREIGN PATENT DOCUMENTS

| JP | 61-101285 A | | 5/1986 |
| JP | 1-195832 A | | 8/1989 |
| JP | 4-161130 A | | 6/1992 |
| JP | 2000-300494 A | | 10/2000 |
| JP | 2000-333895 A | | 12/2000 |
| JP | 2001-70221 A | | 3/2001 |
| JP | 2001-204676 | | 7/2001 |
| JP | 2001-238845 A | | 9/2001 |
| JP | 2003/190069 A | | 7/2003 |
| JP | 2003265400 A | * | 9/2003 |
| JP | 2004-081880 A | | 3/2004 |
| JP | 2004223075 A | * | 8/2004 |

* cited by examiner

*Primary Examiner*—Michael Barr
*Assistant Examiner*—Rita R Patel
(74) *Attorney, Agent, or Firm*—Birch, Stewart, Kolasch & Birch, LLP (57) ABSTRACT

A dishwasher and dryer has a washing vessel (2) accommodating a basket carrying tableware, a water feed path feeding water or hot water for washing and rinsing into the washing vessel (2) through an operation of a water feed valve, a circulating path for spraying feed water in the washing vessel from a nozzle to a dish, and a control circuit (12) controlling a washing step and a rinsing step. In such a dishwasher and dryer, a hard water generating vessel (23) is arranged to carry out a washing step using hard water as feed water in a washing step.

14 Claims, 3 Drawing Sheets

DISH WASHING AND DRYING DEVICE

This Nonprovisional application claims priority under 35 U.S.C. § 119(a) on Patent Application No(s). 2001-399748 filed in Japan on Dec. 28, 2001, the entire contents of which are hereby incorporated by reference.

TECHNICAL FIELD

The present invention generally relates to a dishwasher and dryer, and more particularly to an improved dishwasher and dryer capable of washing in a short time and reducing an amount of detergent for use.

BACKGROUND ART

Figure 3:
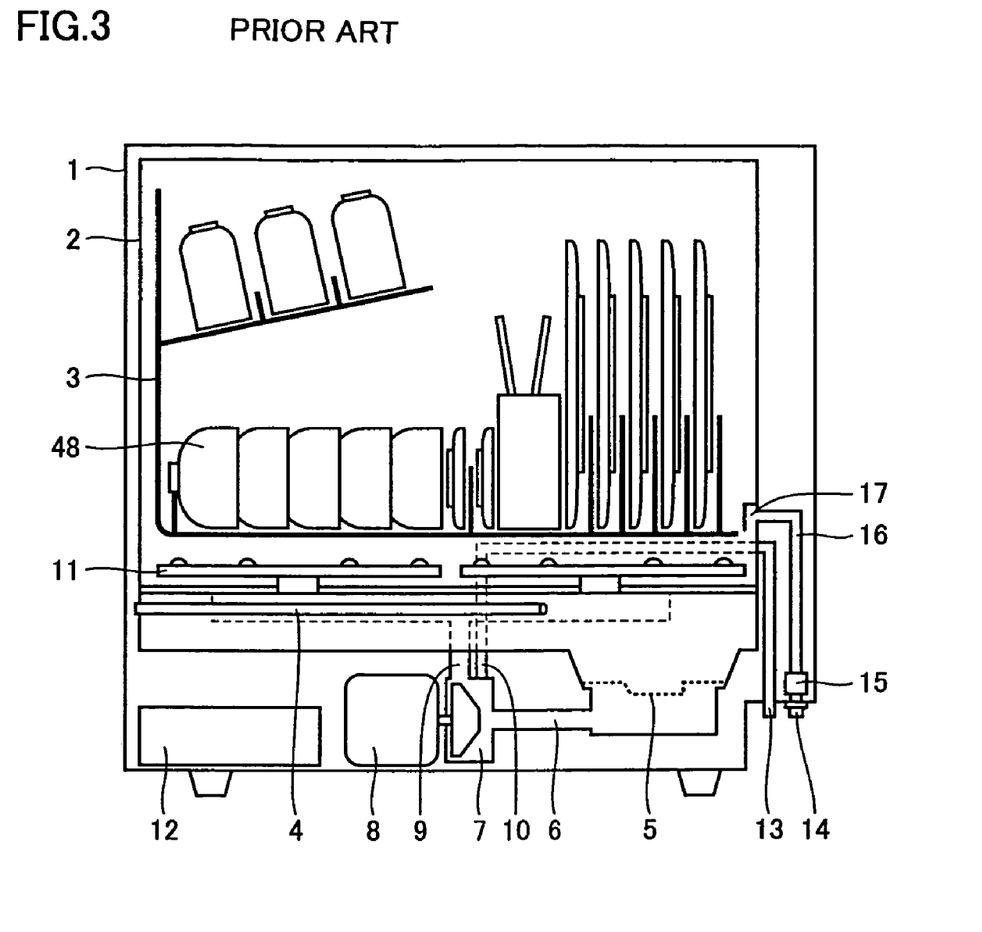
FIG. 3 is a cross sectional view of a conventional dishwasher and dryer.

A conventional dishwasher and dryer shown in FIG. 3 accommodates tableware 48 placed in a dish basket 3 in a washing vessel 2. In operation, the operation is started by applying detergent, then closing the door, and pressing a start button.

When a water feed valve 15 is operated to open, water is fed from a tap connection portion 14 through a water feed pipe 16 into washing vessel 2 via a water feed inlet 17, and is accumulated above the level at which a heater 4 is soaked. When the feed water is accumulated to the level at which washing can be performed, and a not-shown level sensor senses the level, a control circuit 12 stops the operation of opening water feed valve 15 to stop feeding water and automatically carries out a series of subsequent operations.

Upon the water feed stop, a motor 8 starts forward rotation and an impeller of a pump 7 connected to a motor shaft also starts rotation. Therefore, the pump pressure-feeds water from the bottom portion of washing vessel 2 through a suction pipe 6 into a washing and discharging pipe 9. The water is further supplied from discharging pipe 9 to a rotary nozzle 11, is sprayed vigorously from a nozzle opening to tableware 48 placed thereabove, and is repeatedly circulated.

Here, heater 4 is powered as necessary to heat the feed water. Accordingly, the effects of the mechanical force of the washing water sprayed from rotary nozzle 11, the heat, and the detergent cause the dirt to be detached, dissolved, and decomposed from the dishes, thereby keeping the dishes washed. When the washing water attains a set temperature or when a set time has elapsed, the washing step is ended by rotating motor 8 backward to discharge the dirty washing water in washing vessel 2 from pump 7 through a drain discharge pipe 10 to the outside of the washing vessel via a drain outlet 10. Then, water feed valve 15 is operated to open to feed fresh tap water, followed by a rinsing step.

In the rinsing step, the dirt and detergent left on the dishes and the washing vessel is let out and rinsed by repeating several times a step of rotating pump 7 forward to spray water from nozzle for rinsing and thereafter rotating pump 7 again backward for discharging the water. At this time, in the final rinsing step, the water is heated by the heater to a high temperature for rinsing.

Once all the rinsing steps are ended by discharging the water in the final rinsing step, a not-shown air-blowing fan starts its operation, thereby starting a drying step. External air is blown into the washing vessel and exhausted through an air outlet provided in the vicinity of the door. In addition, heater 4 is operated on and off to dry tableware 48 and the inside of the washing vessel. Upon the end of the dry operation for any given time, the operation of the air-blowing fan and the heater terminates, whereby all the steps are ended.

In recent years, with the growing environmental awareness, environmental burdens of detergent drainage are taken seriously. When a dishwasher and dryer washes the dishes without detergent, starch dirt, among dirt such as starch, protein, and oils and fats, can be washed away only with the mechanical force and heat, taking much time at an appropriate temperature.

While the oils and fats can also be separated from a dish with an increased temperature, without detergent, they reattach to the dish, causing slimming after washing or fogging on a glass product. Moreover, unlike the other dirt, the protein dirt such as egg degrades to harden with a higher temperature, which is hardly washed away without detergent.

When tap water is used for rinsing, hardness components including Ca ions, Mg ions, and the like in the tap water form calcium carbonate or the like, which is whitely left on the surface of dishes, causing water spots. In Europe where the hardness of the tap water is particularly high, water spots are more likely to occur. Then, in Europe, a dishwasher and dryer that uses an ion-exchange resin to soften the tap water to be fed is commercially available.

The tap water in Japan is soft water containing less hardness components as compared with Europe. Yet, even a small amount of dirt such as oil and fat components left on a dish surface causes the binding with the hardness components, readily forming water spots. Accordingly, Japanese Patent Laying-Open No. 2000-300494 proposes a structure having an ion-exchange apparatus provided in a water feed path to soften the fed tap water in one or both of the washing step and the final rinsing step.

Furthermore, Japanese Patent Laying-Open No. 2001-238845 proposes a structure further including regenerating means in a water-softening apparatus for regeneration prior to the final rinsing-step. In any case, tap water is softened for washing and rinsing. In the latter case, the hardness component released from the water-softening apparatus using a regeneration agent at the time of regeneration is only discharged, and the hardness component and Na ions in salt are not utilized for washing.

DISCLOSURE OF THE INVENTION

The present invention is made to solve the aforementioned problem and is aimed to provide an improved dishwasher and dryer capable of washing in a short-time and reducing the amount of detergent for use.

In accordance with the present invention, in a washing method of a dishwasher and dryer having: a washing vessel accommodating a basket carrying tableware; a water feed path feeding water or hot water for washing and rinsing into the washing vessel through an operation of a water feed valve; a circulating path for spraying feed water in the washing vessel from a nozzle to a dish; and a control circuit controlling a washing step and a rinsing step, hard water generating means is arranged to perform a washing step using hard water as feed water in the washing step.

In a preferable embodiment of the present invention, it is preferable that a washing step is performed using hard water at a hardness higher than 180 mg/L (in terms of $CaCO_3$, hereinafter) as the feed water in the washing step.

In a more preferable embodiment of the present invention, a rinsing step is performed using soft water at a hardness lower than 50 mg/L as feed water in a rinsing step.

In a more preferable embodiment of the present invention, washing is performed using soft water at a hardness lower than 50 mg/L, prior to a washing step using hard water.

In a more preferable embodiment of the present invention, the water feed path is formed of a plurality of paths that can be switched, a vessel filled with a hard water generating ceramic in the form of granular, mass, foam, or honeycomb is arranged in the middle of at least one of the paths to cause a hardness component to dissolve into water that is allowed to pass through, and water is passed through at least the ceramic-filled vessel in feeding water in a washing step.

In a more preferable embodiment of the present invention, at least one or more kinds selected from the group consisting of calcium sulfate, calcium sulfite, calcium chloride, calcium lactate, magnesium chloride, magnesium sulfate, calcium glycerophsphate as a ceramic for dissolving a hardness component.

In a more preferable embodiment of the present invention, a time period during which water is passed through the ceramic-filled vessel in feeding water in a washing step is set long when a hardness of tap water is low.

In a more preferable embodiment of the present invention, a time period during which water is passed through the ceramic-filled vessel in feeding water in a washing step is set short when a hardness of tap water is high.

In a more preferable embodiment of the present invention, a filled vessel filled with an ion exchanger of an ion-exchange resin or an ion-exchange zeolite is arranged in the middle of the water feed path, where when soft water is to be fed to the washing vessel, a hardness component in tap water is removed through ion exchange to produce soft water to be fed, and when hard water is to be fed to the washing vessel, salt water is passed through the filled vessel of ion exchanger to cause a hardness component stored in a previous operation and/or a preceding step to be released, thereby producing hard water to be fed.

In a more preferable embodiment of the present invention, when hard water obtained by passing salt water through the filled vessel of ion exchanger is used for washing, a salt concentration of feed water accumulated in the washing vessel is 0.3% or higher.

In a more preferable embodiment of the present invention, when a hardness of tap water is low, one or more washing steps or rinsing steps or water feed/discharge steps are added, or an amount of salt water passed through the ion exchanger is increased.

In a more preferable embodiment of the present invention, when a hardness of tap water is high, one or more washing steps or rinsing steps are eliminated, or an amount of salt water passed through the ion exchanger is reduced.

In a more preferable embodiment of the present invention, an operation mode is included in which soft water or raw tap water is used in feeding water in a preceding step, a regeneration step is added, before the start of a washing step or immediately before a rinsing step after the end of a washing step, for passing salt water through the filled vessel of ion exchanger to release and discharge a stored hardness component, and soft water is used as feed water at least in a rinsing step.

In a more preferable embodiment of the present invention, a detergent is not used in a washing step.

As described above, the present invention utilizes hard water obtained by passing water through a vessel filled with a ceramic causing a hardness component to dissolve, which is arranged at a water feed path. Alternatively, it utilizes hard water obtained by arranging an anionic ion exchanger at a water feed path, softening water by storing a hardness component in tap water through ion exchange at the time of rinsing, supplying a regeneration agent such as salt water to cause the hardness component stored in the cation ion exchanger to be released at the time of washing. Therefore, at the time of washing, water rich in the hardness component and Na ions is used.

Accordingly, protein dirt is quickly dissolved in washing water because of the salting-in effect, and for a small amount of oil dirt, oils and fats are enclosed to prevent reattachment, so that the washing efficiency is increased and washing can be performed even without detergent.

Even in washing using hard water together with detergent, dishwasher-and-dryer-specific detergents do no bind with the hardness component and do not produce a metallic soap, which would decrease the effect of the detergent, since they use a nonionic surfactant in most cases. Since the ability to dissolve protein is increased, the washing performance is improved with a short-time washing and with a reduced amount of detergent for use. In addition, when the cation ion exchanger described above is used, soft water is used at the time of rinsing, thereby preventing water spots.

A washing method of the dishwasher and dryer in accordance with the embodiments of the present invention will be described with reference to the figures.

BEST MODE FOR CARRYING OUT THE INVENTION

First Embodiment

Figure 1:
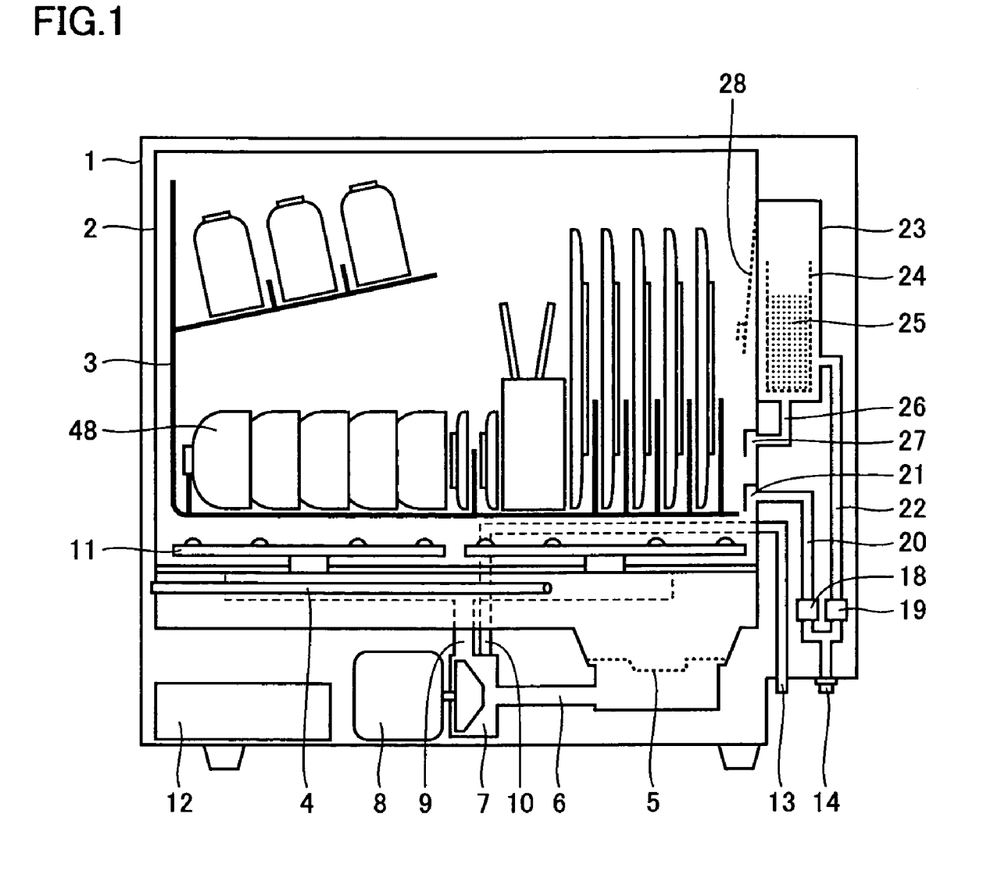
FIG. 1 is a cross sectional view of a dishwasher and dryer in accordance with a first embodiment.

Referring to FIG. 1, a dishwasher and dryer includes a cabinet 1 and a washing vessel 2. Washing vessel 2 contains a dish basket 3 slidably toward the front for accommodating tableware 48. A pump 7 connected to a shaft of a motor 8 is arranged at the bottom portion of washing vessel 2. Pump 7 uses, for example, a forward/backward rotating type motor, with a pump casing including one inlet and two outlets. The discharge outlets are coupled to a washing and discharging pipe 9 and a drain discharge pipe 10, respectively. Both of the discharge outlets are provided with switching valves to allow one of the outlets to be opened. In the forward rotation, the switching valve closes the drain outlet under the dynamic pressure of the flow in the casing caused by rotation of a pump impeller, so that the water sucked by suction pipe 6 is pressure-fed to washing and discharging pipe 9. In the backward rotation, the switching valve closes the washing and discharging outlet to pressure-feed the water to drain discharge pipe 10.

The washing water accumulated in the washing vessel through the forward-rotation of the pump is passed through a residue filter 5, is pressure-fed from suction pipe 6 through washing and discharging pipe 9 to rotary nozzle 11, where the water is sprayed to tableware 48 accommodated immediately above the rotary nozzle.

Upon the backward rotation of the pump, the water accumulated in washing vessel 2 is passed from suction pipe 6 through drain discharge pipe 10 and is then discharged to the outside via a drain outlet 13.

The pump structure is not limited thereto, and a pump may include one motor shaft and two casings, each including an inlet and an outlet, and washing and discharging impellers for switching between washing and discharging through forward/backward rotation. Alternatively, a washing pump and motor as well as a discharging pump and motor may be provided independently.

A heater 4 for heating the washing water at the time of washing and rinsing and for heating air in the washing vessel for drying at the time of drying is arranged at a position where it is soaked in the water when the water is accumulated to the washing level in the vicinity of the bottom portion of washing vessel 2. A control circuit 12 for executing and controlling a series of sequences from washing through rinsing to drying using a variety of sensors is arranged in the vicinity of the cabinet bottom.

A connection portion 14 is provided for supplying tap water from a tap into the system through a hose. It then branches into two directions, one of which allows the water to be supplied from a tap water feed valve 18 directly to the washing vessel through a tap water feed pipe 20. The other allows the water to be supplied from a hard water feed valve 19 to a hard water generating vessel 23 through a hard water generating vessel feed pipe 22.

A ceramic containing basket 24 configured to let in water from all the faces thereof is provided in hard water generating vessel 23 in such a manner that it can be removed through a ceramic containing basket slot 28. The basket contains a hard water generating ceramic 25 in the form of granular, mass, foam, honeycomb, and the like, such as calcium sulfate, calcium sulfite, calcium chloride, calcium lactate, magnesium chloride, magnesium sulfate, calcium glycerophsphate, and the like. A hard water feed pipe 26 is connected at the bottom surface of hard water generating vessel 23 for coupling with a hard water feed inlet 27 that supplies hard water into the washing vessel.

In the dishwasher and dryer configured as described above, after accommodating tableware in the vessel and then closing the door without applying detergent, the washing is started by opening hard water feed valve 19 to feed tap water into hard water generating vessel 23. As the tap water is gradually accumulated at the bottom of the hard water generating vessel, the water flows into the basket through the periphery and bottom of ceramic containing basket 24 and then flows out with the bottom portion of hard water generating ceramic 25 being submerged by a certain amount.

At this point, the hard water generating ceramic gradually dissolves to produce a hardness component such as Ca ions or Mg ions in the tap water, resulting in hard water at a certain hardness. The hard water thus produced is fed from hard water feed inlet 27 to the washing vessel by any given amount. Thereafter, hard water feed valve 19 is closed, and tap water feed valve 20 is opened to feed tap water to the level at which the washing can be performed, thereby starting a series of washing steps.

The operating method in the washing step is basically similar to the conventional example, and description thereof will not be repeated. Unlike the conventional example, however, the washing with hard water rich in Ca ions, Mg ions causes a salting-in effect that allows protein such as egg to be easily dissolved, resulting in good washing performance even without detergent. The magnitude of the salting-in effect depends on ions as follows. The ions to the left side have a stronger salting-in effect to facilitate dissolution of dirt. By contrast, the ions to the right side likely cause a salting-out effect where the dirt tends to agglomerate.

At the start of the rinsing step after the end of the washing step, tap water feed valve 18 is opened to feed any given amount of tap water from tap water feed inlet 21 into the washing vessel directly without the hardness component dissolved. Here, if the rinsing step consists of a plurality of steps, tap water is fed through the operation of opening the tap water feed valve, in all the rinsing steps. Although the amount of the hard water generating ceramic is gradually reduced during the repeated operations, in such a case, ceramic containing basket slot 28 is opened and ceramic containing basket 24 is removed to be replenished with a hard water generating ceramic.

Alternatively, the hard water generating vessel may be formed of a unit having a column-like container filled with water generating ceramics, having an inlet at one end and an outlet at the other end, where hard water is obtained by passing water through the entire amount of ceramics. The subsequent basic operating method from the rising step through the drying step to the end of the operation is similar to the conventional example, and description thereof will not be repeated.

The hardness of tap water varies with regions. In a region where the hardness of tap water is low, the time period during which the hard water feed valve opens is set long through the starting key operation at the start of the washing step, so that the amount of water passing through the hard water generating ceramic is increased, thereby increasing the dissolution amount of the hardness component. On the other hand, in a region where the hardness of tap water is high, the reverse operation is performed: the time period during which the hard water feed valve opens is set short at the start of the washing step, so that the amount of water passing through the hard water generating ceramic is reduced, thereby reducing the dissolution amount of the hardness component.

Table 1 shows the results obtained by using calcium sulfate as the hard water generating ceramic to dissolve protein dirt of yolk and milk at a variety of hardness.

TABLE 1

| Total hardness (mg/L) | Remaining yolk dirt area | Remaining milk dirt area |
|---|---|---|
| 800 | 0% | Heavy fog |
| 380 | 0% | Slight fog |
| 300 | 0% | Slight fog |
| 200 | 5% | Slight fog |
| 180 | 20% | Slight fog |
| 150 | 70% | Slight fog |
| 100 | 90% | Slight fog |
| 60 (tap water) | 90% | Slight fog |
| 0 | 100% | Little fog |

In the case of yolk, the dirt was applied to a bowl with a brush and thereafter dried for an hour. With the addition of water at any given hardness, it was left for four minutes and then stirred for a minute. The remaining yolk dirt areas were compared. It can be seen that the hardness 180 (mg/L) or higher dissolves the yolk dirt because of the salting-in effect.

In the case of milk, milk was poured into a transparent glass and thereafter thrown away, so that a milk film was formed on the inner surface. After being left for an hour, it was left for four minutes with the addition of water at any given hardness, and then stirred for a minute. The remaining fogging areas were compared. For the milk dirt, fogging hardly occurs with a lower hardness, that is, with the use of soft water. With a higher hardness, fogging likely occurs because of the salting-out effect. The fog, however, is eliminated by subsequent rinsing with soft water at a hardness of 100 mb/L or lower.

Table 2 shows a comparison of washing performance by JEMA voluntary standard test method.

TABLE 2

|  | Conventional example (with detergent) | Conventional example (without detergent) | Example 1 (without detergent) | Example 1 (with detergent) | Example 2 (without detergent) | Example 2 (with detergent) |
|---|---|---|---|---|---|---|
| Washing rate (JEMA test method) | 59.1% | 43.6% | 65.4% | 70.0% | 67.3% | 72.4% |

Calcium sulfate was used as the hard water generating ceramic, and the hardness at the time of washing was set at 500 (mg/L). Under these conditions, measurements were made with detergent and without detergent (using a nonionic surfactant). The washing performance in the present embodiment is better even without detergent than the conventional method with detergent. When a detergent is used together, the washing performance is further improved because of the synergistic effect. In particular, the egg dirt, which would be left on the dish after washing in the conventional example, is completely washed away in the present embodiment as shown in Table 2. In other words, the use of a detergent based on a nonionic surfactant of dishwasher-and-dryer-specific detergents causes the synergistic effect of the detergent and the hard water, which improves the washing performance as compared with the washing only with detergent, although the present embodiment has been illustrated with an example without detergent.

Second Embodiment

Figure 2:
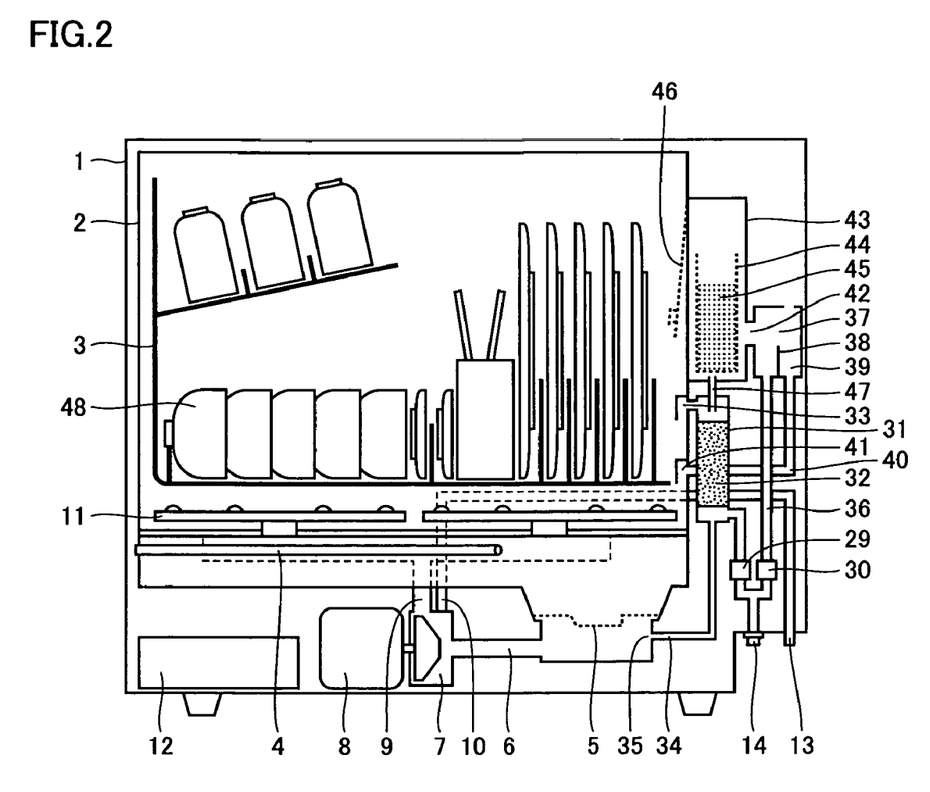
FIG. 2 is a cross sectional view of a dishwasher and dryer in accordance with a second embodiment.

Referring to FIG. 2, a part of the structure that is different from the first embodiment shown in FIG. 1 will be described. The only structure different from the first embodiment is a water feed path. Connection portion 14 is provided for supplying tap water from a tap into the system through a hose.

Connection portion 14 then branches into two directions, one of which allows water to be supplied through a hard water feed valve 30 from an overflow tank feed pipe 36 to an over flow tank 37. The other branch is connected to an ion-exchange vessel 31 through a soft water feed valve 29. Overflow tank 37 is provided with two gates, one of which lets the water flow into a return water tank 39, and the other of which lets the water flow into a common salt vessel 43.

A return water feed pipe 40 is connected at the bottom portion of return water tank 39 to communicate with a return water feed inlet 41 formed at a portion of washing vessel 2. A common salt basket 44 containing common salt 45 is accommodated in common salt vessel 43. The salt basket is structured to let in water from all the faces thereof. By opening a common salt basket slot 46 provided at a portion of washing vessel 2, common salt basket 44 can be removed to be replenished with common salt. An opening is provided at the bottom of common salt vessel 43 in communication with the upper portion of ion-exchange vessel 31 through a salt water feed pipe 47.

Ion-exchange vessel 31 is filled with an ion exchanger 21 such as a cation exchange resin or a cation ion exchange zeolite such as DIAION SKIB (R) available from Mitsubishi Chemical Corporation, Amberlite IR120B (R) available from ORGANO Corporation, or the like, with spaces at the upper and lower portions. Salt water feed pipe 47 opens into the front portion of the upper space, and the side surface of the upper space is in communication with a soft water feed inlet 33 formed at washing vessel 2.

The lower space of ion-exchange vessel 31 communicates with a water feed path from soft water feed valve 29, and a hard water feed pipe 34 in communication with the vicinity of the lowermost part of washing vessel 2 is connected at the bottom portion of ion-exchange vessel 31.

In the dishwasher and dryer configured as described above, after accommodating tableware in the vessel and closing the door without applying detergent, the washing is started by opening hard water feed valve 29 to supply tap water to the overflow tank. The tap water supplied into overflow tank 37 overflows here and is divided at any given ratio to feed into return water tank 39 and common salt vessel 43. The water supplied to return water tank 39 is fed into the washing vessel as it is through return water feed inlet 41 as tap water. The other water supplied to common salt vessel 43 penetrates into common salt basket 44 to cause common salt 45 stored therein to dissolve, resulting in salt water at a high concentration of approximately 5-10%, which is supplied from salt water feed pipe 47 at the bottom to ion-exchange vessel 31.

The salt water fed into the upper space of ion-exchange vessel 31 sinks downward from the upper portion of ion exchanger 32 under its own weight and drips into the lower space. Here, the ion exchanger holds a large amount of the hardness components such as Ca ions, Mg ions included in the tap water, which have been exchanged in advance with Na ions under the ion exchange effect in the water softening at the rinsing step in the previous operation.

Therefore, while the salt water passes through the ion exchanger, the hardness components such as Ca ions, Mg ions, and the like held in the ion exchanger are substituted with Na ions at a high concentration in the common salt and released, resulting in hard salt water, which drips into the lower space of the ion-exchange vessel. The hard water thus generated passes through hard water feed pipe 34, and flows into and accumulates in washing vessel 2 through hard water feed inlet 35.

After a prescribed amount of salt water passes through the ion-exchange vessel, hard water feed valve 30 is closed, and soft water feed valve 29 is opened to feed tap water into the ion-exchange vessel. The water is fed into the washing vessel while washing away the remaining salt. When the water in the washing vessel reaches the washing start level, hard water feed valve 30 is closed, and the pump starts forward rotation, thereby starting the washing step using hard washing water. The operation method of the washing step is basically similar to the conventional example, and description thereof is thus not repeated. Unlike the conventional example, however, the washing with hard salt water allows protein such as egg to dissolve easily because of the salting-in effect by Ca ions, Mg ions, Na ions, resulting in good washing performance even without detergent.

Furthermore, the existence of Na ions allows the dirt to be dissolved at a hardness lower than the hardness illustrated in the first embodiment. At the start of the rinsing step after the end of the washing step, soft water feed valve 29 is opened to feed tap water into the lower space of ion-exchange vessel 31. Small part of the feed water flows through hard water feed pipe 34 into washing vessel 2, while most of the feed water passes through ion exchanger 32 and feeds through the upper space of ion-exchange vessel 31 into the washing vessel from soft water feed inlet 33.

At the start of the preceding washing step, ion exchanger 32 releases Ca ions and Mg ions using salt water, and therefore the ion exchanging ability (the water softening ability) of the ion exchanger is restored enough. Accordingly, while passing through the ion exchanger, the tap water is softened because of the ion exchanger of the hardness component. The resultant soft water is fed through soft water feed inlet 33 into washing vessel 2, thereby starting the rinsing step similar to the conventional control.

Here, if the rinsing step consists of a plurality of steps, the soft water is fed to the washing vessel through the operation of opening the soft water feed valve, in all of the rising steps. The minimum required volume of the ion exchanger is such that allows processing of a volume of water necessary to carry out one cycle of a plurality of rinsing steps. The rinsing step is always performed using soft water, so that even if milk dirt or the like is left in the washing step, the dirt is easily washed away. In addition, water spots are prevented if drying is performed after rinsing.

If the first washing step is performed, by opening soft water feed valve 29 to feed soft water into the washing vessel, as the preceding step before the washing step using hard water and salt water as described above, dirt such as milk and bean-based food dissolves well and easily removes from the tableware. Even when the cation concentration is too high in the second washing step using hard water and salt water at the next step, coagulation of dirt such as milk and bean-based food on the dish surface due to the salting-out effect does not occur. On the contrary, the egg protein easily dissolves because of the salting-in effect, thereby improving the washing efficiency as a whole.

The present embodiment has been illustrated with an example without detergent. Similar to the first embodiment, however, when washing is carried out using a detergent based on a nonionic surfactant among dishwasher-and-dryer-specific detergents in accordance with the present embodiment, the synergetic effect of the detergent and Ca ions and Mg ions in the hard water and Na ions in the salt water improves the washing performance as compared with the washing only with detergent using tap water.

The hardness of tap water varies with regions. In the region with a low hardness of tap water, the time period during which the hard water feed valve is opened is set long through the starting key operation at the start of the washing step, so that the amount of salt water passing through the ion exchanger is increased, whereby the released amount of the hardness component is increased. In addition, the amount of Na ions can be increased because of the increased amount of salt water. Alternatively, one or more washing steps and/or rinsing steps are added, or water feed and discharge is carried out without washing and rinsing, so that the amount of the hardness component stored in the ion exchanger is increased, whereby a large amount of hardness component can be released by feeding salt water at the start of the washing step.

In the region with a high hardness of tap water, the reverse operation is performed: at the start of the washing step, the time period during which the hard water feed valve is opened is set short, so that the amount of salt water passed through the ion exchanger is reduced, and in addition, the amount of Na ions can be reduced because of the reduced amount of salt water.

Alternatively, one or more washing steps and/or rinsing steps are eliminated, so that the amount of the hardness component stored in the ion exchanger is reduced, whereby the amount of the hardness component released by feeding salt water at the start of the washing step can be reduced.

Although the present embodiment has been illustrated with an example without detergent, the operations using a detergent based on an anionic surfactant and using a soap such as fatty acid sodium in accordance with the present embodiment may cause the bonding of the hardness component with the detergent component, resulting in a metallic soap, thereby possibly degrading the washing performance.

In this case, the user may operate a key to set an operation mode in which washing is performed using tap water or soft water rather than using water containing a large amount of hardness component and Na ions and rinsing is performed by soft water. In this case, water is fed by opening soft water feed valve 29 in all the washing and rinsing steps. In this operation mode, a regeneration step is added before the start of the washing step or before the rinsing step immediately after the end of the washing step, where the ion exchange ability is refreshed by dripping salt water into ion exchanger 31 using hard water feed valve 30 to cause the hardness component stored in the ion exchanger to be released, the released hardness component is passed from hard water feed pipe 34 to washing vessel 2, and pump 7 is thereafter rotated backward to discharge the water rich in the hardness component in the washing vessel to the outside of the vessel.

Table 3 shows the results of dissolving yolk as protein dirt in water at a variety of salt concentrations that is obtained by dissolving salt in soft water.

TABLE 3

| Common salt concentration | Remaining yolk dirt area |
|---|---|
| 1.0% | 10% |
| 0.5% | 20% |
| 0.4% | 40% |
| 0.3% | 70% |
| 0.2% | 100% |
| Tap water (hardness 60 mg/L) | 100% |

The yolk dirt was applied to a bowl with a brush and thereafter dried for an hour. With the addition of water at any given salt concentration, it was then left for four minutes and stirred for a minute. The remaining yolk dirt areas were compared. It was found that the yolk dirt dissolves because of the salting-in effect with a salt concentration of 0.3% or higher.

Table 2 shows the comparison of washing performance under the JEMA voluntary standard test method in the present second embodiment. Here, the hardness of the washing water is 250 (mg/L), the salt concentration is 0.3% without detergent, and the hardness of rinsing water is 20 (mg/L).

The effect on the egg dirt is particularly good, similar to the first embodiment. In addition, the washing performance on a transparent glass is good.

Therefore, it can be seen that in accordance with the present embodiment, the washing performance in the present embodiment without detergent is equal to or better than the washing performance using normal tap water using detergent.

Furthermore, the washing performance is further improved because of the synergetic effect of the detergent and the hardness component, when the washing test is performed under the same conditions as described above using a dishwasher-and-dryer-specific detergent based on a nonionic surfactant.

In other words, although the present embodiment has been illustrated with an example without detergent, the washing performance is improved using a detergent based on a nonionic surfactant among dishwasher-and-dryer-specific detergents, because of the synergetic effect of the detergent and the hard water, as compared with the washing only with detergent.

The embodiments disclosed herein should be taken by way of example not by way of limitation. The scope of the present invention is shown not in the foregoing description but shown in the claims, and it is intended that all the equivalents to the claims and all the modifications within the claims should be embraced.

As described above, the use of hard water as feed water for use in washing causes the salting-in effect to facilitate dissolution of protein dirt including egg or the like and to allow washing without detergent. Furthermore, washing with soft water before washing using hard water improves the washing performance without coagulation of milk and bean-based food dirt on the surface of dishes, even if the hardness of hard water in washing is too high. In addition, because of the use of soft water in the rinsing step, even if the hardness component used in the washing step as well as the bonding component of hardness component and dirt are left on the tableware and in the washing vessel until the rinsing step, they can easily be dissolved and rinsed completely, and water spots are also prevented. In use with a detergent based on a noionic surfactant in the washing step, the washing performance is further improved because of the synergetic effect of the detergent and the hardness component.

In a preferable configuration of the present invention, hard water can be generated with a simple structure where water is only passed through a hard water generating ceramic, so that the structure can be simplified. In addition, the hardness of hard water can easily be adjusted only by changing the amount of water passed through the hard water generating ceramic, that is, by changing the feed time, so that variations in tap water hardness with regions can be compensated.

In a more preferable configuration of the present invention, soft water and hard water can be obtained using an ion exchanger, and Na ions in salt water can also be utilized during generation of hard water, so that dirt can be dissolved even at a lower hardness, thereby improving the washing performance. Furthermore, the common salt familiar to any home is used, rather than using a material such as a hard water generating ceramic that is hardly available at general household, thereby increasing the convenience of the product. In addition, the hardness can be adjusted only by changing the amount of salt water passed through the ion exchanger or by changing the amount of softened water in the washing step or the rinsing step, so that variations in tap water hardness with regions can be compensated. Still further, an operation mode in which washing and rinsing are performed only with soft water is added, so that the washing performance is not degraded even in the washing using a detergent that is likely bound with the hardness component.

In a more preferable configuration of the present invention, the running cost can be decreased by performing washing without detergent. In addition, the environmental burden can be alleviated since no detergent is discharged, thereby providing users with an earth-friendly dishwasher and dryer.

It is noted that the embodiments disclosed herein should be taken by way of example not by way of limitation. The scope of the present invention is shown not in the foregoing description but shown in the claims, and it is intended that all the equivalents to the claims and all the modifications within the claims should be embraced.

INDUSTRIAL APPLICABILITY

The present invention is applicable to a dishwasher and dryer for performing an operation of washing used tableware instead of human beings and further performing drying at home and stores.

The invention claimed is:

1. A dishwasher and dryer having: a washing vessel (2) accommodating a basket carrying tableware; a water feed path feeding water or hot water for washing and rinsing into said washing vessel through an operation of a water feed valve; a circulating path for spraying feed water in said washing vessel from a nozzle (11) to a dish (48); and a control circuit (12) controlling a washing step and a rinsing step, wherein
hard water generating means is arranged to perform a washing step using hard water as feed water in the washing step.

2. The dishwasher and dryer according to claim 1, wherein a washing step is performed using hard water at a hardness higher than 180 mg/L (in terms of $CaCO_3$, hereinafter) as said feed water in the washing step.

3. The dishwasher and dryer according to claim 1, wherein a rinsing step is performed using soft water at a hardness lower than 50 mg/L as feed water in a rinsing step.

4. The dishwasher and dryer according to claim 1, wherein washing is performed using soft water at a hardness lower than 50 mg/L, prior to a washing step using hard water.

5. The dishwasher and dryer according to claim 1, wherein the water feed path is formed of a plurality of paths that can be switched, a vessel (24) filled with a hard water generating ceramic (25) in the form of granular, mass, foam, or honeycomb is arranged in the middle of at least one of the paths to cause a hardness component to dissolve into water that is allowed to pass through, and water is passed through at least the ceramic-filled vessel (24) in feeding water in a washing step.

6. The dishwasher and dryer according to claim 5, wherein at least one or more kinds selected from the group consisting of calcium sulfate, calcium sulfite, calcium chloride, calcium lactate, magnesium chloride, magnesium sulfate, calcium glycerophsphate as a ceramic for dissolving a hardness component.

7. The dishwasher and dryer according to claim 5, wherein a time period during which water is passed through the ceramic-filled vessel (24) in feeding water in a washing step is set long when a hardness of tap water is low.

8. The dishwasher and dryer according to claim 5, wherein a time period during which water is passed through the ceramic-filled vessel (24) in feeding water in a washing step is set short when a hardness of tap water is high.

9. The dishwasher and dryer according to claim 1, wherein a filled vessel (31) filled with an ion exchanger (32) of an ion-exchange resin or an ion-exchange zeolite is arranged in the middle of the water feed path, where when soft water is to be fed to the washing vessel (2), a hardness component in tap water is removed through ion exchange to produce soft water to be fed, and when hard water is to be fed to the washing vessel (2), salt water is passed through said filled vessel (31) of ion exchanger (32) to cause a hardness component stored in a previous operation and/or a preceding step to be released, thereby producing hard water to be fed.

10. The dishwasher and dryer according to claim 9, wherein when hard water obtained by passing salt water through the filled vessel (31) of ion exchanger (32) is used for washing, a salt concentration of feed water accumulated in the washing vessel (2) is 0.3% or higher.

11. The dishwasher and dryer according to claim 9, wherein when a hardness of tap water is low, one or more washing steps or rinsing steps or water feed/discharge steps are added, or an amount of salt water passed through the ion exchanger is increased.

12. The dishwasher and dryer according to claim 9, wherein when a hardness of tap water is high, one or more washing steps or rinsing steps are eliminated, or an amount of salt water passed through the ion exchanger (32) is reduced.

13. The dishwasher and dryer according to claim 9 including an operation mode in which soft water or raw tap water is used in feeding water in a preceding step, a regeneration step is added, before the start of a washing step or immediately before a rinsing step after the end of a washing step, for passing salt water through the filled vessel (31) of ion exchanger (32) to release and discharge a stored hardness component, and soft water is used as feed water at least in a rinsing step.

14. The dishwasher and dryer according to claim 1, wherein a detergent is not used in a washing step.

* * * * *